Patented Oct. 20, 1931

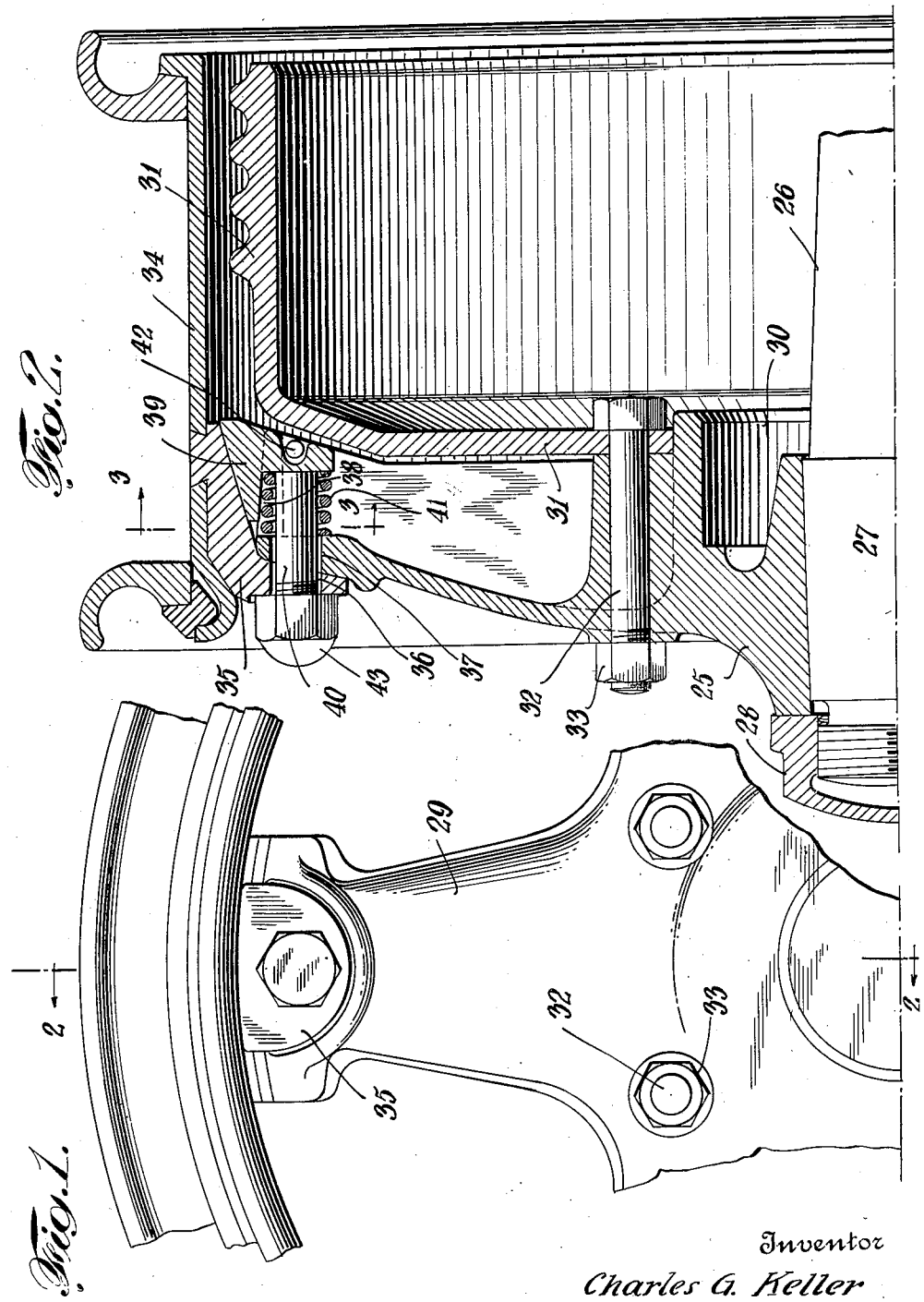

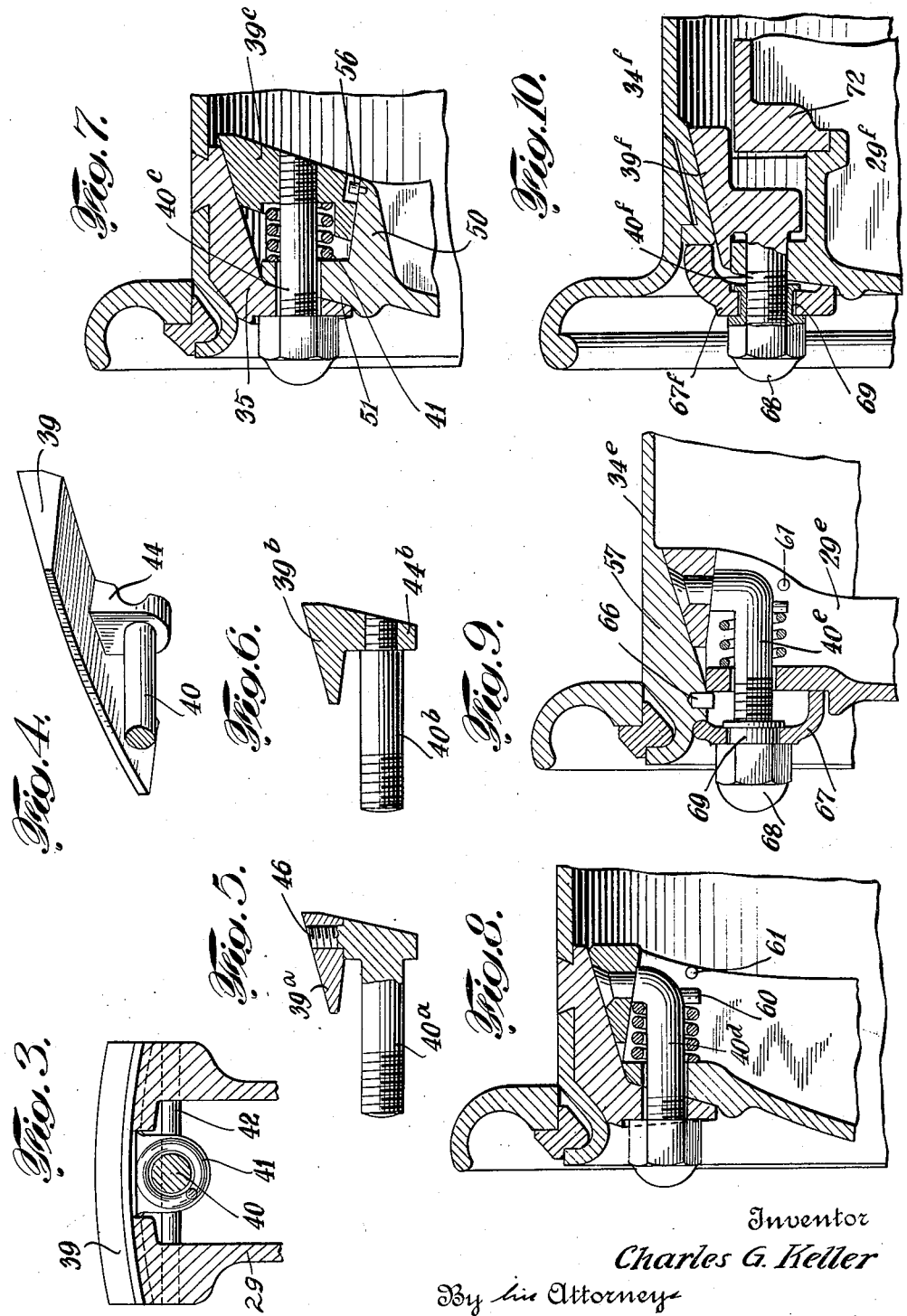

1,827,791

UNITED STATES PATENT OFFICE

CHARLES GEORGE KELLER, OF POUGHKEEPSIE, NEW YORK

VEHICLE WHEEL

Application filed April 26, 1927. Serial No. 186,627.

My invention relates to the means employed for detachably securing a standard or special type of rim in place and is particularly applicable to a fellyless wheel construction in which the tire carrying rim is detachably secured directly to the spoke ends. Certain features of my broad invention might be applied to a wheel having a felly.

As one important feature of my invention, the spoke ends or analogous parts of the wheel are so constructed that the rim when placed in position abuts axially against fixed parts so that the clamping does not tend to shift the position of the rim and accurate positioning of the rim on the spokes is obtained.

As a further important feature, the parts are so designed that the number of separate parts to be removed from the spokes in removing a rim therefrom is very much reduced as compared with the number removed in constructions heretofore in use.

A further feature is the provision of a simple form of wedging device which operates from the inside but is tightened or loosened from the outside.

Another feature of my invention is to provide a construction in which the wedging devices are retained on the wheel when the rim is removed.

As a further feature the bolts which force the wedges into position hold the rim against rotational or radial movement in respect to the wheel body.

In the accompanying drawings, I have illustrated certain embodiments of my invention, but these are to be considered in an illustrating rather than in a limiting sense.

In these drawings:
Fig. 1 is an end view of a portion of the body part of one form of my improved wheel showing one spoke with a tire rim attached thereto;

Fig. 2 is a section on the line 2—2 of Fig. 1;
Fig. 3 is a section taken along the line 3—3 of Fig. 2, of certain wheel parts, the rim being removed;

Fig. 4 is a detail perspective view of one of the wedges;

Figs. 5 and 6 are sections of other forms of wedges; and

Figs. 7, 8, 9 and 10 are sections similar to Fig. 2 but showing different constructions of the parts at the end of the spoke.

The wheel illustrated in Figs. 1 and 2 is of the fellyless or spider type. The hub 25 may be of any suitable shape and proportions, but is shown as adapted to be detachably secured upon a vehicle axle or axle stub shaft 26 by being forced onto a tapered end 27 and held by a cap 28 threaded on the end of the axle. The spokes 29 are preferably of U-shape in cross section and cast integral with the hub. The wheel is provided at the inboard side of the hub with a flange 30 which may receive a suitable roller bearing for supporting the wheel on the axle housing, not shown. The wheel may be provided with a brake drum 31 which may be mounted in any suitable manner as for instance by being mounted on the hub and secured by bolts 32 and nuts 33. By having the brake drum connected with the wheel only at the hub and by spacing the drum from the tire carrying parts, the heat generated by the brake band or shoes will be dissipated before passing by conduction to the rim mounted on the outer ends of the spokes. The heating of the rim and tire thereon will also be guarded against by circulation of air in the spaces between the brake drum, the spokes and the rim. The wheel with attached brake drum illustrated in Fig. 2 may be used either as a rear wheel or a front wheel and in case of such use as a front wheel, the axle may be short and merely pass into the steering knuckle which has a bearing in addition to the bearing mounted in the flange 30. The axle may be secured in position by any suitable means not shown. If used for a rear wheel the axle may be longer and extend into the differential gearing, in case of a street car to an opposite wheel.

I have shown the wheel provided with a rim 34 which is of the type known to the trade as a "Firestone" rim. It is provided with lugs 35 each of which has an inclined surface facing inwardly in a direction having radial and axial components and a substantially radial inwardly extending projection at the outboard part of said face, the projection being provided with an aperture 36. Each spoke 29 is provided at its end on its outboard face with a seat against which the projection of a lug 35 may abut and has an aperture 37 with which the aperture 36 may register when the rim 34 is placed on the wheel. The arrangement of the lugs and the seats at the outer ends of the spokes is such that they butt together in a substantially axial direction and the rim 34 may be placed on the spokes in the desired definite position.

Each spoke is so constructed at the outer end that at each side of the U there is a surface inclined radially inwardly from the outboard side of the spoke, and opposed to the oppositely inclined surface of the radially inner side of the rim lug 35. Between these two oppositely inclined surfaces is a wedge 39 shaped to contact with both inclined surfaces. The wedge is narrowest at the edge toward the outboard side of the wheel and is provided with means projecting beyond this narrow edge and accessible from said outboard side for pulling the wedge into position. As shown it is provided with an offset towards the axis of the wheel and a bolt 40 projecting from said offset through the apertures 36 and 37. A helical spring 41 is interposed between the outer web of the spoke and the downward offset of the wedge so that it tends to shift the wedge to rim-releasing position. The movement in this direction is limited by a stop pin 42 which prevents the withdrawal of the bolt 40 from the aperture 37. When the rim is placed on the spokes it is exactly positioned on the wheel and nuts 43 are screwed on the bolts 40 to retain the rim 34 in such definite position.

It is important to note that while the rim lug abuts against the side of the spoke, a tightening of the nuts pulls the bolt endwise and pulls the wedge tightly into place to clamp the rim. This clamping cannot move the rim axially as the bolts keep the apertures 36 and 37 and it cannot move the rim axially as the nut keeps the lug 35 snugly in position. When the nut is loosened the spring pushes the wedge in an inboard direction and releases the clamps. When the nuts are taken off the rim is loose for ready removal.

As shown more clearly in Figs. 3 and 4, the wedges 39 are arcuate longitudinally to follow the curvature of the rim. They may be of any desired length depending on the construction of the spokes and may have the bolts fixed in any suitable manner.

In Fig. 5 I have shown a stud bolt 40a having a head with a laterally extending threaded shank 46 to be screwed into a longitudinally arcuate wedge 39a.

In Fig. 6, I have shown the bolt 40b having a reduced rear end screwed into the downward offset 44b of a wedge 39b.

In Figs. 3 and 9, I have shown the bolt with an upturned end riveted into the wedge and in Fig. 10 I have shown the bolt and wedge integral.

In Fig. 7, there is shown a rim of the same type as Fig. 2, but the outer end of the spoke is formed with a support 50 spaced radially inwardly from the outer end of the spoke and having its outer surface inclined radially inwardly and in an inboard direction from the portion 51 against which the lug 35 abuts. This inclined surface is radially inward from the bolt aperture and therefore the wedge 39c has its bolt 40c extending from a point intermediate of its inclined surfaces. The spring 41 acts against the wedge itself and the movement of the latter is limited by a stop 56 projecting upwardly from the member 50 into a recess in the wedge at its lower face.

The construction illustrated in Fig. 8 is similar to that shown in Fig. 2 except that the bolt 40d is bent at its inner end and a reduced portion thereof is riveted in the wedge. The bolt has a pin or lug 60 which serves a double function. It serves as a stop for the helical spring and it also may abut against a pin or stop 61 to limit the inner movement of the bolt and the wedge.

The construction illustrated in Fig. 9 has a rim 34e of a modified "Goodyear" type having at its outer edge an annular head 57 presenting an inclined inner surface opposed to the inclined surfaces on the outer ends of the spokes 29e. In this form the exact position of the rim is obtained by pins 66 engaging the spokes at their outer sides to limit axial movement of the rim as do the lugs 35 of the other form of rim. The clamping is effected by bridge pieces 67 engaging at their outer ends with the outboard edge of the rim and at their radially inner ends with the outboard faces of the spokes. The bolts 40e pass through apertures in the members 67 and the clamping is effected by nuts 68 screwed on the outboard ends of the bolts. Preferably the nuts 68 are provided with sleeves 69 which extend through apertures in the members 67 and are spun outwardly at the inboard sides of said members 67 so as to prevent separation thereof. Thus when the nuts are removed the bridge pieces are carried with them and there are therefore no more parts to be separately removed or replaced than there are in the other forms above described.

In Fig. 10, there is shown a rim 34f of the "Goodyear" type which is secured to the spokes 29f by a wedge 39f and bolt 40f similar in general to the wedging device shown in Fig. 4 but held in position on the spokes by a brake drum 72 instead of a stop pin or the like fixed on the spoke. At the outboard end of bolt 40f, there is applied a nut 68 which has a bridging member or device 67f attached thereto in the manner illustrated in Fig. 9 and engaging at its radially outer end the rim 34f and at its radially inner end the outboard face of the spoke. In this form I have omitted the very important feature shown in the other forms, namely the axial abutting of the rim and wheel, so that the drawing of the wedge into place does not disturb the positioning of the rim.

In the foregoing and in the claims I have designated the side of the wheel away from the chassis or body as the outer or outboard side and the side toward the chassis or body as the inner or inboard side. The wedge is pulled toward the outboard side by the bolts.

Having thus described my invention, what I claim as new and desire to secure by Letters Patent is:

1. In combination a wheel body having an inclined wedge supporting surface on its periphery, a rim having an inclined wedge supporting surface, said surfaces being inclined in opposite directions and away from each other toward the inboard side of the wheel, a wedge member engaging said surfaces, means projecting from the inner side of the wheel for pulling the wedge toward the outboard side of said wheel, and resilient means for moving said wedge in the opposite direction.

2. A vehicle wheel adapted to support a rim in a definite axial position at its periphery, wedges mounted on said wheel and having bolt studs projecting through the wheel to the outboard side thereof, a spring for each wedge urging it toward the inboard side, and a stop for each wedge to limit said movement thereof.

3. A fellyless wheel having spokes, each having a seat on its outer end facing in a direction having radial and axial components and an axial passage near the outer end, a wedge extending across the outer end of the spoke, a bolt secured to the wedge and extending through the passage, means to urge said bolt and wedge toward the inboard side of the wheel, and means to prevent the withdrawal of said bolts from said openings.

4. A longitudinally arcuate wedge adapted for interposition between a wheel and a rim, and having an inward offset, and a stud bolt projecting from said offset in the direction toward which the wedge surfaces converge, said offset having at its rear a recess to receive a fixed stop.

5. A vehicle wheel having a body portion, a removable rim, and means for clamping the rim in position, including an arcuate wedge and a bolt carried by the wedge and projecting beyond the thinner edge for drawing the wedge outward axially into clamping position, and a spring for pushing the wedge in the opposite direction.

6. A wheel body having a wedge supporting surface on its periphery, a rim having an axially inwardly facing surface, a wedge member engaging between said surfaces, a bolt connected to said wedge and extending to the outboard side of the wheel for forcing said wedge into position, and means on the body of the wheel and in the path of movement of the wedge for limiting the movement of the latter in the opposite direction.

7. A vehicle wheel having a body portion, a removable rim, a wedge for engaging between said body portion and said rim for securing the rim in position, a spring normally tending to move said wedge to releasing position, a stop for limiting said movement, and means for forcing said wedge in the opposite direction.

8. A vehicle wheel having a body portion, a removable rim, a wedge for engaging between said body portion and said rim for securing the rim in position, a spring normally tending to move said wedge to releasing position, a stop for limiting said movement, and a bolt for forcing said wedge in the opposite direction, said bolt engaging the body portion and the rim to prevent creeping movement of the rim.

9. A vehicle wheel having a body portion presenting a wedge seat at its periphery, a removable rim having a radially and axially inwardly facing wedge seat and a radially inwardly extending projection for axially abutting against the wheel body, a wedge for engaging between said seats, a bolt spaced inwardly radially of the wheel from said wedge and having one end connected to the base portion of the wedge and the other projecting through said wheel body, a nut on the outer end of said bolt, and a member connected to said nut and engaging said wheel body and said rim for forcing said projection against said wheel body.

10. A vehicle wheel having a body portion presenting a wedge seat at its periphery, a removable rim having a radially inwardly facing wedge seat and a radially inwardly extending projection for axially abutting against the wheel body, a wedge for engaging between said seats, a bolt spaced inwardly radially of the wheel from said wedge and having one end connected to the base portion of the wedge and the other projecting through said wheel body, a nut on the outer end of said bolt, and a member engaging said wheel body and said rim for holding said projection against said wheel body during the tightening of said nut and the drawing of said wedge into position.

11. A fellyless vehicle wheel having a series of spokes, each presenting a wedge seat on its periphery and disposed parallel to the axis of the wheel, a removable rim having a radial inwardly extending part adjacent to one edge and presenting a wedge seat facing in a direction having a radial component and an axial inboard component, a plurality of wedges, one on each spoke and movable on the seat of the spoke in a direction parallel to the wheel axis, all of said wedges engaging the seat on said rim, each wedge having a radial inwardly extending projection terminating at a point nearer to the axis than the spoke seat, an endwise movable bolt extending in an outboard direction from said projection and through said wheel body parallel to said axis, a nut on said bolt for forcing said bolt and wedge axially, and a removable member engaging said rim projection and said wheel body for positioning said rim against movement in an outboard direction on said wedge.

Signed at Poughkeepsie in the county of Dutchess and State of New York this 22d day of April, A. D. 1927.

CHARLES GEORGE KELLER.